United States Patent

Vaccaro

[15] 3,654,435

[45] Apr. 4, 1972

[54] MAGNETICALLY READABLE BAR AND CODE

[72] Inventor: Angelo Vaccaro, Port Washington, N.Y.

[73] Assignee: Columbia Controls Research Corporation, Glen Cove, N.Y.

[22] Filed: June 2, 1970

[21] Appl. No.: 42,738

[52] U.S. Cl. ....................235/61.12 M

[51] Int. Cl. ....................G06k 19/06

[58] Field of Search ..............235/61.11 E, 61.12 R, 61.12 C, 235/61.12 N, 61.12 M; 250/219; 340/149 A, 174.1 M

[56] References Cited

UNITED STATES PATENTS 2,936,112 5/1960 Dickinson ....................235/61.11 D

*Primary Examiner*—Daryl W. Cook
*Attorney*—Johnson & Kline

[57] ABSTRACT

A code formed of bars having one type of bar for one piece of information and another type of bar for another piece of information with the bars being formed of magnetizable material and in which the ratio of the amplitude of the electromagnetic wave produced by the leading edges of both types of bars being moved past a character reading system is substantially increased by slanting or inclining the leading edge of one type of bar with respect to the movement while maintaining the leading edge of the other type of bar perpendicular to the movement.

7 Claims, 7 Drawing Figures

PATENTED APR 4 1972 3,654,435

INVENTOR
Angelo Vaccaro
BY
Johnson and Kline
ATTORNEYS

MAGNETICALLY READABLE BAR AND CODE

In U.S. patent application Ser. No. 16,858, filed Mar. 5, 1970, there is disclosed a character reading system for reading characters and providing an electrical representation of each character read. The characters are represented in a bar code with the code consisting of spaced bars having two different effective heights and with the bars being formed of magnetic particles. Each bar when passed beneath a magnetic reading head will produce an electrical signal with the leading edge of each bar providing specifically a positive voltage spike while the trailing edge of each bar produces a negative voltage spike.

Each character in the code is formed with the same number of bars and the two different heights of the bars are intermingled differently for each different character. When the bars are automatically read by the system disclosed in the above-noted application, an electrical representation of a short bar is stored as a binary 0 while that of the long bar is stored as a binary 1 and the combination of the binary states constitutes the electrical representation in binary form for each character. One system therein disclosed depends upon the difference in amplitude of the positive voltage spikes to differentiate between the two sizes of bars and hence determine which binary state will be stored for the bar with the long bar having a larger amplitude spike to be stored as a binary 1 while a small bar has a small amplitude spike and is stored as a binary 0.

The amplitude of a voltage spike depends on the rate of change of flux sensed by the reading head which in turn is altered by many factors such as speed of movement, distance from the reading head, quantity of magnetic particles, height of the bar, etc., with the major dependency heretofore being made on the height difference to produce the different amplitudes in the voltage spikes. Normally the amplitude ratio between the two bars will be essentially directly related to the height ratio which in the heretofore system has been about 3 to 1. Thus the system is adjusted to a threshold voltage valve wherein spikes having a voltage level above the threshold being read as binary 1 spikes and any spikes below the threshold level being stored as binary 0 spikes. Under most conditions, the threshold level will accurately differentiate between the two values of voltage spikes but the other factors which effect the amplitude could in some instances cause some of the binary 1 spikes not to have a value large enough to exceed the threshold value while these same factors may be varied in the other direction so that even some of the binary 0 spikes would exceed the threshold level. In both instances, inaccurate automatic reading of the character occurs, which is extremely unsatisfactory.

It is accordingly an object of the present invention to provide a bar code which is capable of being read with greater accuracy over a wider range of conditions than heretofore possible.

Another object of the present invention is to provide a bar code which produces a greater difference in the amplitudes of the voltage spikes produced by similar edges of the bars than that produced just by the difference in heights of the bars.

A further object of the present invention is to achieve the above objects with a bar code in which the code remains the same as heretofore with the only suggested difference being in the configuration of similar edges of one height of the bar.

In carrying out the present invention, the bar code herein disclosed is adapted to be used on documents which are desired to be read by a magnetic character reading system such as disclosed in my above-noted patent. The documents on which the code is useable includes a credit card in which the bar code represents numbers or letters for identifying the card, orders, invoices, and in general those documents which have information which is desired to be automatically transferred into business equipment such as computers, for subsequent use. The bar code is advantageously imprinted onto the document using ink having magnetic particles in order to be magnetically read by the system. Preferably, the same number of bars are used to represent each character and the code has two different types of bars, specifically two different height bars with the bars being intermingled differently for representing each character.

In automatically reading the bar code using the above-disclosed system, the document bearing the code is passed beneath the magnetic reading head with the reading head producing a positive voltage spike for the leading edge of each bar and a negative voltage spike for the trailing edge. The difference in amplitude of the leading edges of the bars are used as information spikes to effect the storing of a binary 1 for the long bar and a binary 0 for the short bar while the trailing edge of each bar is used as an index to shift the state of a shift register into which the binary state of the bar is stored and prepare it for storing the next bar. Thus the system requires no differentiation between the amplitude of the trailing edge spikes beyond the fact that they exist, but as to the leading edge spikes it is essential that each type of spike be positively identified.

In accordance with the present invention, the leading edges of the bars are shaped to cause the large bar to produce a maximum voltage amplitude by having a large, abrupt change in permeability at its leading edge while the leading edge of the small bar is made to produce the minimum possible voltage spike amplitude by having a gradual change in permeability. In one embodiment, the leading edge linearly extends from the bottom of the trailing edge of the preceding bar to the top of the trailing edge of the same bar while in another embodiment the height of the bar is increased by having the apex of the leading edge be intermediate the height of the short bar and for the sides to linearly diverge outwardly to the top and bottom of the trailing edge of the short bar. Thus in both embodiments the height of the leading edge of the short bar is only gradually increased while the trailing edge remains constant as in the prior disclosed code.

Other features and advantages will hereinafter appear.

Referring to the drawing.

Figure 4:
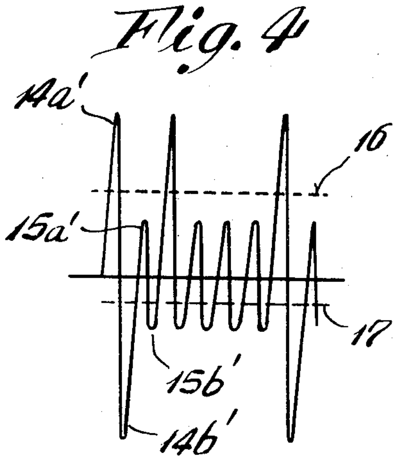
FIG. 4 is the voltage wave produced by reading the prior art code.

Referring to the drawing, the magnetic character reading system is generally indicated by the reference numeral 10 and includes a magnetic reading head 11. The bar code of the present invention is shown substantially enlarged in FIG. 1 and it is imprinted or otherwise formed on a document 12 with the reading system causing the document 12 to move in the direction of the arrow 13 beneath the reading head 11. Such a character reading system is disclosed in my above-noted application where it is employed to read the prior art code shown in FIG. 2. reading The system provides in a shift register an electrical representation of the bars read with each long bar indicated by the reference numeral 14 in the prior art code producing a binary 1 while each short bar 15 produces a binary 0 with the state of at least each intermediate bar being stored. The binary state is determined by the height of each bar with the leading edge 14*a* of a long bar producing, as shown in FIG. 4, a positive voltage spike 14*a'* while the leading edge 15*a*, of a short bar 15 produces the positive voltage spike 15*a'*. The difference in height between the two voltage spikes is noted and is used to determine the binary state that is stored.

The trailing edge of each bar indicated by the reference characters 14*b* and 15*b* are used to index the shift register to prepare it for storing the state of the next bar. Thus the system utilizes the negative voltage spikes **14*b*' and 15*b*' merely as an indexing command and does not attempt to differentiate between the amplitudes thereof. Accordingly, positive voltage spikes which appear for example above a selected level, such as a threshold, line 16 in FIG. 4 will produce a binary 1 while those below the threshold will produce a binary 0. All negative spikes having amplitude greater than the level indicated by the line 17 will effect indexing, the line 17** being used to minimize noise from being interpreted as a command.

It has been found that if the voltage level indicated by line 16 is set in the system that factors which can affect the amplitude of the voltage wave may cause the spike **14*a*' to be less than the level or the spike 15*a*'** to be greater than the level and accordingly produce inaccurate reading of the code.

As the amplitude of spikes **14*a*' and 15*a*' are dependent upon the abruptness of the change in magnetizable material under the reading head from the document to the leading edge 14*a* the amplitude of the two spikes may be substantially altered by altering the relative heights of the two bars. However, this has been found substantially impractical as shortening the bar 15 tends to reduce the negative voltage spike which, of course, would produce errors while lengthening the bar 14** causes the code to be basically impractically too large and consume excessive room on the document. One ratio that has been selected is a height ratio of 3 to 1 which produces a voltage spike ratio of also 3 to 1, though 2 to 1 and 4 to 1 are not completely unacceptable but more apt to be influenced by various factors and produce inaccurate reading.

Figure 1:
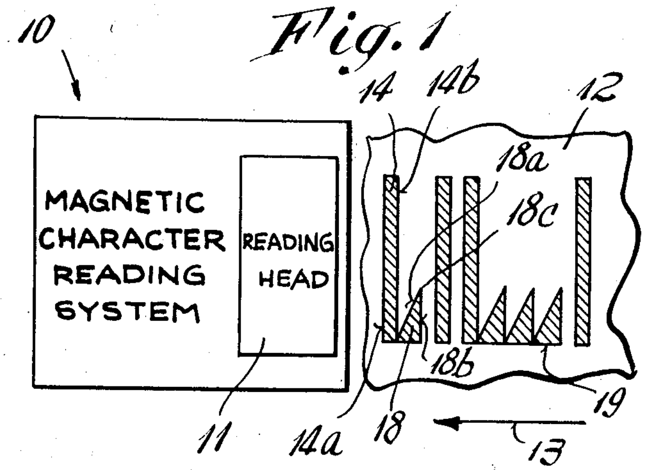
FIG. 1 is a diagrammatic representation of the code of the present invention together with a block diagram indicating the magnetic character reading system having a reading head.
Figure 3:
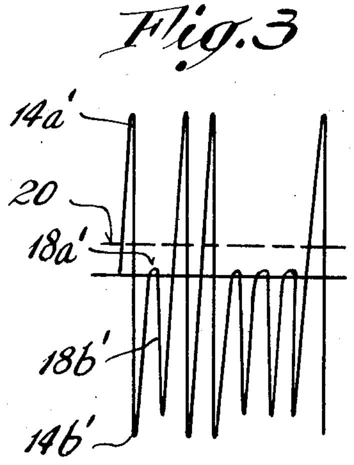
FIG. 3 is a voltage wave produced by the reading of the code of the present invention in FIG. 1.

The present invention, however, produces a substantial difference between the height of the two voltage spikes without shortening the trailing edges of the bars and also without increasing the relative heights between the two bars by the relative shaping of the leading edges of the two types of bars. Thus, as shown in FIG. 1, the long bar 14 remains identical as the prior art bar 14 and thus has the leading edge **14*a* and trailing edge 14*b* which produce a voltage wave as shown in FIG. 3 having a positive spike 14*a*' and a negative spike 14*b*'. The short bar, however, is indicated by the reference numeral 18 and has a trailing edge 18*b* which is identical to the trailing edge 15*b* of the bar 15 but produces a larger negative voltage spike 18*b*'**.

The leading edge of each short bar indicated by the reference character **18*a* extends from a common bottom line 19 of the bars to a top 18*c* of the trailing edge 18*b*, in essentially a straight line and accordingly presents to the reading head a gradual change in magnetic flux as the bar is relatively moved from the line 19 to the top 18*c*. Thus the positive voltage spike produced by the leading edge 18*a* is of very small amplitude indicated by reference character 18*a*', FIG. 3**.

Figure 2:
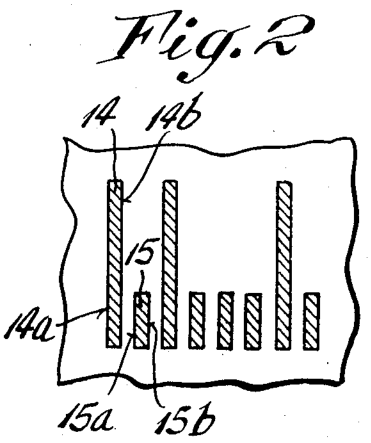
FIG. 2 is the prior art code.

The relative heights between the spikes produced by the leading edges of the prior art code bars as shown in FIG. 2 is basically the same ratio as their heights and accordingly is approximately 3 to 1 in the embodiment disclosed. In the code of the present invention wherein there is a gradual increase of the leading edge, it has been found that an amplitude ratio of greater than 15 to 1 may be achieved which substantially increases the accuracy of the reading system over a wider range of factors which effect the amplitude of the voltage spikes. Thus, there is shown in FIG. 3 the selected voltage level above which a spike causes the storing of the binary 1 may be indicated by the reference numeral 20 and be set substantially lower than the line 16 in FIG. 4 and still produce a greater accuracy in differentiating between the two types of voltage spikes.

Figure 5:
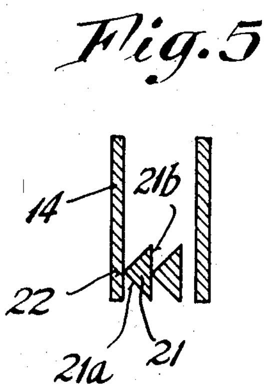
FIG. 5 is another embodiment of the code of the present invention.

Shown in FIG. 5 is a further embodiment of the present invention in which the long bars 14 are identical as in the previous codes while short bars 21 have the same height as the short bars in the other codes and thus have the straight trailing edge **21*b*. Also the leading edge 21*a* is caused to increase gradually with respect to the reading head 11 by forming the leading edge 21*a* to have an apex 22 and diverging sides which are essentially linear from the apex 22 to the ends of the trailing edge 21*b***.

Figure 6:
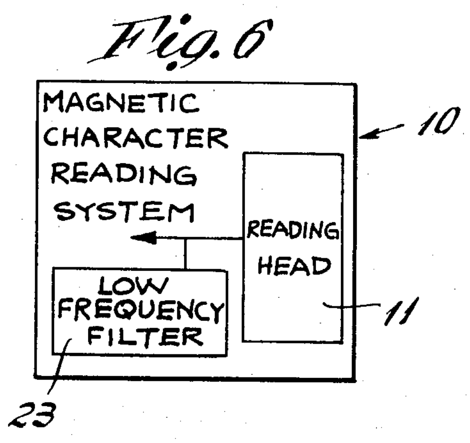
FIG. 6 is a block diagram showing an addition to the system for further increasing the difference in reading between the two bars.

Though the leading edge voltage spike **18*a*' has a value substantially less than the value of the spike 14*a*', a further increase may be achieved by using a low frequency filter in the character reading system as shown in FIG. 6. The filter 23 will reduce the value of the voltage spike 18*a*' after being read by the reading head but before being differentiated in the system to essentially nothing so that the remainder of the system will effectively not receive any spike for the edge 18*a* or 21*a* and hence there will be almost an infinite amplification ratio. The filter will have no effect on either the spike 14*a* or the trailing edge spikes. It is also understood that the filter 23** will also filter low frequency noise.

Figure 7:
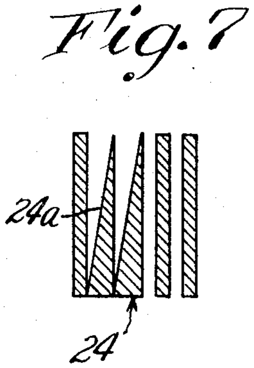
FIG. 7 is a further embodiment of the code.

It will be understood that in both codes above-described the bars have two different heights which are essentially the same as in the prior art code and also the bars are spaced essentially the same difference apart. If desired, as shown in FIG. 7, the same height bars may be used with the "short" bars 24, which produce the small voltage spike having a slanting forward edge **24*a* while the long bars 14 are identical to the long bars in the previously described codes. The slanting edge 24*a* also produces a low frequency spike as compared to the spike produced by the edge of the bar 14 and hence can be very effectively minimized by the low frequency filter 23**.

It has also been found that the negative spike **18*b* produced by a short bar 18 has a larger amplitude than the negative spike produced by the prior art short bar 15. This is believed attributable to the gradually increasing amount of magnetic particles in the short bar causing the reading head to become positively accustomed without producing a positive spike and when the abrupt trailing edge occurs, the amount of flux change is the sum of the gradually increasing leading edge rate plus the change caused by the trailing edge. With a flux change greater than just the trailing edge change, a larger amplitude voltage spike 18*b* will be produced and it will tend to approximate the value of voltage spike 14*b* produced by the trailing edge of a long bar. As each trailing edge spike is used, the higher amplitude of both spikes enables the line 17** to be set essentially to eliminate all extraneous signals and also provide a larger range in which the spikes may vary without incorrect reading.

It will accordingly be appreciated that there has been disclosed a bar code which is used with an automatic character reading system to provide a greater accuracy in reading the code over a wider range of variables that affect the system. The system depends upon differentiating between the amplitudes of the voltage spikes produced by the two types of bars and in the present invention the difference in amplitude is substantially maximized by shaping the leading edge of the long bar to produce a maximum amplitude spike while shaping the leading edge of the short bar to produce a minimum voltage spike. Thus, by simply changing the shape of the leading edge of the short bars, the present invention has substantially increased the accuracy of the reading system with the change neither requiring more room on the document or increased cost to produce the code.

Variations and modifications may be made within the scope of the invention and portions of the improvements may be used without others.

I claim:

1. In a code formed of a plurality of bars with there being two types of bars, said types of bars being intermingled differently for each different character represented in the code, said bars being formed with magnetizable particles and adapted to be automatically read by a character reading system to produce an electrical representation of the characters by storing one binary state for one type of bar and the other binary state for the other type of bar and with the system differentiating between the two types of bars by the amplitude of the voltage spike produced by reading the similar edges of each type of bar, the improvement comprising the shape of the similar edge of one type of bar being different than that of the other type of bar to produce an amplitude of a voltage spike substantially less than the other bar.

2. The invention as defined in claim 1 in which the shape of the edge of the one bar is made to more gradually increase in height traverse to the path of movement than the leading edge of the other bar.

3. The invention as defined in claim 1 in which the one type of bar is shorter than the other type of bar transverse to the movement of the bars relative to the character reading system, in which the bars have a common point aligned with the movement, in which the one bar has its similar edge gradually increasing in height transverse to the movement while the other bar has an abrupt increase in height.

4. The invention as defined in claim 3 in which there is a space between adjacent other bars and in which the beginning of the similar edge of the one bar is positioned closely adjacent the adjacent edge of the preceding bar to essentially eliminate any gap therebetween.

5. The invention as defined in claim 4 in which the beginning of the similar edge of the one bar is at one end of the bar and the edge increases linearly heightwise along a line that slants with respect to the movement.

6. The invention as defined in claim 4 in which the beginning of the similar edge of the one bar is intermediate the height of the one bar and the edge increases divergingly therefrom.

7. The invention as defined in claim 1 in which each bar has another similar edge transverse to the movement and in which the another similar edge of both bars is essentially linear and perpendicular to the movement.

* * * * *